(12) United States Patent
FitzGerald et al.

(10) Patent No.: US 10,318,960 B2
(45) Date of Patent: Jun. 11, 2019

(54) METHOD AND SYSTEM FOR IMPROVING RECYCLING THROUGH THE USE OF FINANCIAL INCENTIVES

(75) Inventors: Patrick K. FitzGerald, Philadelphia, PA (US); Ron Gonen, New York, NY (US)

(73) Assignee: RECYCLEBANK, LLC, Philadelphia, PA (US)

( * ) Notice: Subject to any disclaimer, the term of this patent is extended or adjusted under 35 U.S.C. 154(b) by 488 days.

(21) Appl. No.: 13/100,384

(22) Filed: May 4, 2011

(65) Prior Publication Data

US 2011/0264493 A1 Oct. 27, 2011

Related U.S. Application Data

(63) Continuation of application No. 11/345,867, filed on Feb. 2, 2006, now Pat. No. 7,949,557.

(60) Provisional application No. 60/650,610, filed on Feb. 7, 2005.

(51) Int. Cl.
```
G06Q 30/00    (2012.01)
G06Q 30/02    (2012.01)
G06Q 20/26    (2012.01)
G07F 7/06     (2006.01)
```

(52) U.S. Cl.
CPC ............ *G06Q 30/00* (2013.01); *G06Q 20/26* (2013.01); *G06Q 30/0207* (2013.01); *G06Q 30/0208* (2013.01); *G06Q 30/0235* (2013.01); *G07F 7/0609* (2013.01)

(58) Field of Classification Search
CPC .................................. G06Q 30/0207
USPC .......................................... 705/14
See application file for complete search history.

(56) References Cited

U.S. PATENT DOCUMENTS

| | | |
|---|---|---|
| 4,248,334 A | 2/1981 | Hanley et al. |
| 4,949,528 A | 8/1990 | Palik |
| 5,035,564 A | 7/1991 | Matsumoto |
| 5,072,833 A | 12/1991 | Hansen et al. |
| 5,209,312 A | 5/1993 | Jensen |
| 5,209,361 A | 5/1993 | Grubb, Jr. |
| 5,230,393 A | 7/1993 | Mezey |
| 5,251,761 A | 10/1993 | Hansen et al. |
| 5,304,744 A | 4/1994 | Jensen |

(Continued)

FOREIGN PATENT DOCUMENTS

| | | |
|---|---|---|
| JP | 2001-312551 | 9/2001 |
| JP | 2002073896 A | 3/2002 |

(Continued)

OTHER PUBLICATIONS

Intl' Search Report and Written Opinion for PCT/2009/031129 dated Jun. 16, 2009, 12 pages.

(Continued)

*Primary Examiner* — Matthew L Hamilton
(74) *Attorney, Agent, or Firm* — John Maldjian; Maldjian Law Group LLC

(57) ABSTRACT

Methods and systems are provided for improving recycling and participation rates by providing financial incentives to households engaged in recycling. Certain embodiments of the invention relate to reduction of costs associated with waste collection and the enhancement of collection efficiency. Other embodiments of the invention relate to opening a marketing channel for participating retailers to build value from responsible corporate citizenship.

13 Claims, 2 Drawing Sheets

(56) References Cited

U.S. PATENT DOCUMENTS

| | | |
|---|---|---|
| 5,333,984 A | 8/1994 | Bayne et al. |
| 5,355,987 A | 10/1994 | DeWoolfson et al. |
| 5,416,279 A | 5/1995 | Tseng |
| 5,425,456 A | 6/1995 | Erickson |
| 5,447,017 A | 9/1995 | Becher et al. |
| 5,484,246 A | 1/1996 | Horning et al. |
| 5,628,412 A | 5/1997 | Hulls |
| 5,699,525 A | 12/1997 | Enbutsu et al. |
| 5,704,558 A | 1/1998 | Arrott |
| 5,712,990 A | 1/1998 | Henderson |
| 5,833,429 A | 11/1998 | McNeilus et al. |
| 5,837,945 A | 11/1998 | Cornwell et al. |
| 5,842,652 A | 12/1998 | Warsing et al. |
| 5,871,114 A | 2/1999 | Anderson et al. |
| 5,923,016 A | 7/1999 | Fredregill et al. |
| 5,934,867 A | 8/1999 | Christenson |
| 5,960,402 A | 9/1999 | Embutsu et al. |
| 5,965,858 A | 10/1999 | Suzuki et al. |
| 5,983,198 A | 11/1999 | Mowery et al. |
| 6,026,370 A | 2/2000 | Jermyn |
| 6,055,573 A | 4/2000 | Gardenswartz et al. |
| 6,292,785 B1 | 9/2001 | McEvoy et al. |
| 6,496,804 B2 | 2/2002 | McEvoy et al. |
| 6,448,898 B1 | 9/2002 | Kasik |
| 6,663,004 B2 | 12/2003 | Wagner et al. |
| 6,664,897 B2 | 12/2003 | Pape et al. |
| 6,718,343 B2 * | 4/2004 | Kamata |
| 6,952,625 B2 | 10/2005 | Uetake et al. |
| 6,993,712 B2 | 1/2006 | Ramachandran et al. |
| 7,032,820 B2 | 4/2006 | Kreiner et al. |
| 7,133,895 B1 | 11/2006 | Lee et al. |
| 7,134,084 B1 | 11/2006 | Rashid et al. |
| 7,136,865 B1 | 11/2006 | Ra et al. |
| 7,167,836 B2 | 1/2007 | Gottselig et al. |
| 7,251,620 B2 | 7/2007 | Walker et al. |
| 7,267,262 B1 | 9/2007 | Brown |
| 7,313,602 B2 | 12/2007 | Ono et al. |
| 7,398,225 B2 | 7/2008 | Voltmer et al. |
| 7,398,226 B2 | 7/2008 | Haines et al. |
| 7,398,248 B2 | 7/2008 | Phillips et al. |
| 7,424,441 B2 | 9/2008 | George et al. |
| 7,428,498 B2 | 9/2008 | Voltmer et al. |
| 7,496,524 B2 | 2/2009 | Voltmer et al. |
| 7,689,682 B1 | 3/2010 | Eldering et al. |
| 7,999,688 B2 | 8/2011 | Healey et al. |
| 2002/0026326 A1 | 2/2002 | Stevens |
| 2002/0040564 A1 | 4/2002 | Killingbeck et al. |
| 2002/0082920 A1 | 6/2002 | Austin et al. |
| 2002/0188509 A1 | 12/2002 | Ariff et al. |
| 2003/0065610 A1 | 4/2003 | Brown et al. |
| 2003/0115097 A1 | 6/2003 | Sokei et al. |
| 2003/0139981 A1 | 7/2003 | Bunji et al. |
| 2003/0158818 A1 | 8/2003 | George et al. |
| 2003/0233278 A1 | 12/2003 | Marshall |
| 2004/0167799 A1 * | 8/2004 | Berry .................................. 705/1 |
| 2004/0199401 A1 | 10/2004 | Wagner et al. |
| 2004/0199545 A1 | 10/2004 | Wagner et al. |
| 2004/0200689 A1 | 10/2004 | Compton et al. |
| 2004/0243468 A1 | 12/2004 | Cohagan et al. |
| 2005/0038572 A1 * | 2/2005 | Krupowicz ................... 700/305 |
| 2005/0043963 A1 | 2/2005 | Soga et al. |
| 2005/0059849 A1 | 3/2005 | Liu |
| 2005/0080520 A1 | 4/2005 | Kline et al. |
| 2005/0112632 A1 | 5/2005 | Voltmer et al. |
| 2005/0131757 A1 | 6/2005 | Chan et al. |
| 2005/0192963 A1 | 9/2005 | Tschiegg et al. |
| 2005/0256767 A1 | 11/2005 | Friedman |
| 2005/0273340 A1 | 12/2005 | Yamamoto |
| 2006/0069588 A1 | 3/2006 | Ritter |
| 2006/0080819 A1 | 4/2006 | McAllister |
| 2006/0178933 A1 | 8/2006 | FitzGerald et al. |
| 2006/0224450 A1 | 10/2006 | Moon |
| 2006/0253407 A1 | 11/2006 | Waddell et al. |
| 2006/0271423 A1 * | 11/2006 | Hiranoya ........................ 705/14 |
| 2006/0273180 A1 | 12/2006 | Ammond et al. |
| 2007/0100694 A1 | 5/2007 | Kopps |
| 2007/0102506 A1 | 5/2007 | Stevens |
| 2007/0174073 A1 | 7/2007 | Hunscher et al. |
| 2007/0260466 A1 | 7/2007 | Casella et al. |
| 2007/0219862 A1 | 11/2007 | Casella et al. |
| 2008/0061124 A1 | 3/2008 | Langlois et al. |
| 2008/0061125 A1 | 3/2008 | Langlois et al. |
| 2008/0069641 A1 | 3/2008 | Kreiner et al. |
| 2008/0077498 A1 | 3/2008 | Ariff et al. |
| 2008/0077499 A1 | 3/2008 | Ariff et al. |
| 2008/0086411 A1 | 4/2008 | Olsen et al. |
| 2008/0169342 A1 | 7/2008 | Gonen et al. |
| 2008/0183634 A1 | 7/2008 | Sadler |
| 2008/0208721 A1 | 8/2008 | Bertogg |
| 2009/0125402 A1 | 5/2009 | Voltmer et al. |
| 2009/0138358 A1 | 5/2009 | Gonen et al. |
| 2009/0228406 A1 | 9/2009 | Lopez et al. |
| 2011/0258128 A1 * | 10/2011 | Hambleton ............ G06Q 10/30 |
| | | 705/308 |
| 2015/0154568 A1 * | 6/2015 | Gu ........................ G06Q 10/30 |
| | | 705/308 |

FOREIGN PATENT DOCUMENTS

| | | |
|---|---|---|
| JP | 13-195496 | 10/2002 |
| JP | 2002-297840 | 11/2002 |
| JP | 2003-099520 | 4/2004 |
| JP | 2005-008339 | 1/2005 |
| KR | 10-2002-0084880 | 11/2002 |
| KR | 10-2006-0099489 | 9/2006 |
| KR | 10-2008-0008694 | 1/2008 |
| KR | 10-2008-0013246 | 2/2008 |

OTHER PUBLICATIONS

Intl' Search Report and Written Opinion for PCT/2007/079440 dated Apr. 23, 2008, 10 pages.

Intl' Search Report and Written Opinion for PCT/2008/055687 dated Aug. 20, 2008, 9 pages.

Int'l Search Report and Written Opinion for PCT/2008/055689 dated Jul. 17, 2008, 10 pages.

Int'l Search Report and Written Opinion for PCT/2008/074647 dated Mar. 25, 2009, 8 pages.

Int'l Search Report and Written Opinion for PCT/2009/042812 dated Dec. 21, 2009, 10 pages.

Int'l Search Report and Written Opinion for PCT/2010/021757 dated Aug. 31, 2010, 9 pages.

Int'l Search Report and Written Opinion for PCT/2010/025993 dated Oct. 29, 2010, 11 pages.

Int'l Search Report and Written Opinion for PCT/2009/042801 dated Nov. 30, 2009, 15 pages.

World Economic Forum Names RecycleBank a 2009 Technology Pioneer found at Http://Corporate. Recyclebank.com/press-release . . . Dec. 4, 2008 4 pages.

Peretsman, Natalie, "Rewarding Recycling," Scienceline, Jun. 12, 2008, (5 pgs).

Colimore, Edward, "Cherry Hill Starts Cashing in on Recycling," The Philadelphia Inquirer, Jun. 30, 2008, (2 pgs).

Hays, Julia, "Hauler: New Recycling Program Runs Smoothly," Courier-Post, Jul. 1, 2008, (2 pgs).

It's Easy Being Green: It Pays to Recycle, Center for American Progress, Jul. 16, 2008, (2 pgs).

Satullo, Chris, "The Right Kind of 'Nudge' Improves Life for Citizens," The Philadelphia Inquirer, Jul. 20, 2008, (2 pgs).

Glick, Alexis, "Talking Trash . . . Literally," The Glick Report, Fox Business, Jul. 31, 2008, (1 pg).

Judkis, Maura, "4 Ways to Earn Cash for Recycling," U.S. News & World Report, Jul. 30, 2008, (2 pgs).

Knoblauch, Jessica A., "Turning Your Trash Into Cash," Plenty Magazine, (3 pgs).

Siegel, Robert, "What's Behind a Patchwork of Recycling Rules?" NPR, Jul. 28, 2008, (3 pgs).

Laidler, John, "Residents Find Recycling Has Its Just Reward," The Boston Globe, Jul. 27, 2008, (2 pgs).

(56) References Cited

OTHER PUBLICATIONS

Jones, Charisse, "Residents Reap Rewards for Recycling," USA Today, Jul. 9, 2008, (3 pgs).
Wong, Wylie, "Going Green," Biztech Magazine, Mar. 2008, found at http://www.biztechmagazine.com/article.asp?itemjd=397, (4 pgs.).
Walsh, Bryan, "Making Recycling Really Pay," Time Magazine, Apr. 11, 2008, found at http://www.time.com/time/health/article/0,8599, 1730187,00.html?xid=rss-health, (2 pgs).
Gunther, Marc, "Turning Trash Into Cash," Fortune Magazine, Sep. 20, 2007, found at http://money.cnn.com/2007/09/20/magazines/fortune/recyciebankJortune/index.htm, (3 pgs).
"Bags to Riches," Good Magazine, Mar./Apr. 2007, (1 pg).
Desimone, Bonnie, "Rewarding Recyclers, and Finding Gold in the Garbage," The New York Times, Feb. 21, 2006, found at http://www.nytimes.com/2006/02/21/business/businessspecia1/21 recycle.html?_r=2&ore, (3 pgs).
4 Ways to Earn Cash for Recycling, US News and World Report, Jul. 31, 2008, (2 pgs).
Special Report: RecycleBank Set for the UK? Letsrecycle.com, Jul. 25, 2008, (4 pgs).
New 'American Scrap Coalition' Will Address Global Trade Barriers, Reuters, Jun. 12, 2008, (2 Pgs).
"Technology Pioneers 2009," World Economic Forum, (36 pgs).
Desai, Anuj et al., "The Plenty 20 Awards for 2008," (4 pgs).
Jenny Mero, "Wasteful Thinking" Fortune Magazine, Apr. 2008 (1 pg.).

\* cited by examiner

METHOD AND SYSTEM FOR IMPROVING RECYCLING THROUGH THE USE OF FINANCIAL INCENTIVES

CROSS-REFERENCE TO RELATED APPLICATIONS

This application claims the benefit of U.S. patent application Ser. No. 11/345,867, filed Feb. 2, 2006, which issued as U.S. Pat. No. 7,949,557 on May 24, 2011, which in turn claims the benefit of and priority to U.S. Provisional Patent entitled "System and Method of improving recycling through the use of financial incentives," by inventors Patrick K. Fitzgerald and Ron Gonen, filed on Feb. 7, 2005 and accorded Ser. No. 60/650,610.

FEDERALLY SPONSORED RESEARCH STATEMENT

Not applicable.

THE NAMES OF THE PARTIES TO A JOINT RESEARCH AGREEMENT

Not applicable.

REFERENCE TO MICROFICHE APPENDIX

Not applicable.

BACKGROUND OF THE INVENTION

1. Field of the Invention

The invention is generally directed to methods and systems for improving recycling rates by providing financial incentives to households engaged in recycling. Certain embodiments of the invention relate to the reduction of costs associated with waste collection and the enhancement of collection efficiency. Other embodiments of the invention relate to opening a marketing channel for participating retailers to build value from corporate citizenship.

2. Background

The cost of waste collection and disposal in many cities has reached a critical level. The decrease in available landfill capacity means that the cost for disposing of municipal solid waste continues to increase. Where landfill capacity exists there remains the potential environmental hazards associated with landfill operation. The financial and environmental burdens associated with the disposal of waste in landfills has encouraged municipalities to actively pursue recycling as an alternative.

The cost for disposing waste in landfills has risen dramatically in recent years due to the effects of diminishing landfill space and increasing state landfill taxes. In addition, there is the added environmental cleanup costs for landfills that leak dangerous chemicals into the environment.

As the global manufacturing sector has developed, the demand for recyclable goods has increased. Manufacturers have long recognized that it is far cheaper to manufacture from recyclable material than it is to extract and manufacture from virgin material.

The advances in Single Stream Recycling (SSR) technology reduces the cost of recycling. Recent improvements in the automated separation of recyclables at processing centers have dramatically reduced the cost of collecting, sorting, and processing recyclables. SSR technology enables an automated process to separate a commingled group of recyclables (for example, cardboard, paper, plastic, glass and aluminum). SSR technology enables municipalities to cut collection cost by only having to collect one recycling container, as opposed to separate containers, and permits processing centers to cut costs by using an automated process to separate the recyclables, as opposed to manual labor, to reduce labor costs and sorting time.

Federal, State, and local governments have dramatically increased funding for recycling programs.

However, a lack of advanced tools in strategy, operations management and information technology in the waste management industry has limited the ability of municipalities to implement incentives for households to recycle, to design effective strategies, and to measure performance. Low recycling rates have stifled the potential for municipalities to cut operating costs and generate revenue.

Recycling reduces the financial burden of waste disposal, reduces energy costs, and conserves our environment's resources. The average household recycling rate, after rising steadily in the 1990's, has stalled. By way of example, the 14th Annual Nationwide Survey of Solid Waste Management in the United States, conducted by Scott Kaufman, Research Director of RecycleBank, found that twenty-eight states reported a decrease in recycling since 2001.

There is, therefore, a need to establish recycling initiatives which recognize the existing problems associated with the disposal of waste and promote recycling efforts as part of a waste management program.

BRIEF SUMMARY OF THE INVENTION

The invention is generally directed to methods and systems for improving recycling rates by providing financial incentives to households engaged in recycling. Certain embodiments of the invention relate to the reduction of costs associated with waste collection and the enhancement of collection efficiency. Other embodiments of the invention relate to opening a marketing channel for participating retailers to build value from corporate citizenship.

An embodiment of the invention provides methods and systems for improving recycling rates by providing financial incentives to households for the amount recycled. A further embodiment of the invention provides methods and systems relating to reduction of costs associated with waste collection and the enhancement of collection efficiency. An aspect of the invention provides methods and systems relating to opening a marketing channel for participating retailers to build value from corporate citizenship.

An embodiment of the invention also provides acquisition and statistical analysis techniques for recycling data, which will allow, for example, monitoring of compliance with applicable laws, extractions of trends from populations, long term planning, performance analysis, and standardization of municipal grant applications.

While information technology tools have revolutionized the way many governments and industries operate, the waste management industry remains behind this rapidly ascending efficiency curve. During the past decade, the waste management industry has introduced information technology tools in order to design efficient routes for haulers. However, when it comes to data collection and performance analysis, information technology tools have been conspicuously absent.

To address this problem, an embodiment of the present invention tracks and analyzes tonnage and participation at the household level in order to design and implement effective strategies to increase recycling. This data acquisition and analysis, in turn, enables officials in all sectors of the economy to recognize and address trends on a micro and macro level in the following ways:

A. Accurately measure the effectiveness of recycling programs on a geographic basis, e.g., tonnages collected, recycling rates, and participation rates.

B. Provide detailed data describing the effectiveness of recycling programs, e.g., help optimize route collection systems by matching tonnages collected with truck capacities, help optimize route collection systems by matching truck capacities with participation rates for the route, and provide data and analysis detailing the overall efficiency of recycling programs.

C. Examine the socio-economic relationships between recycling participation and demographic characteristics.

The amount of recyclables from households can be tracked from the curbside to the point of ultimate disposition. Associated hauling costs, tipping fees, distances traveled, etc., may be entered into tracking programs and applied to cost-benefit analyses. Transfer stations, materials recovery facilities (MRFs), and processing facilities will be able to determine from where they are getting their recyclables and how or whether they can more efficiently and economically collect and receive these recyclables.

By managing effectiveness at the household level of collection, routes can be designed for optimum use of truck capacity and labor. Calculations as to the number of households or tonnages needed to optimize routes can be performed. Additionally, because data is collected on a household to household basis, the often-arbitrary lines separating neighborhoods can be factored out, allowing for degrees of freedom in waste management planning that were previously impossible to achieve.

Studies have shown that there is wide variance in recycling rates between different socio-economic classes within individual municipalities. Often, recycling rates are lower in moderate-income areas and rise with increasing median household incomes. An embodiment of the present invention, through a combination of incentives, seeks to reduce this variance. Moreover, data collected will allow the effective targeting of outreach efforts to increase recycling rates, further reducing this variance.

Aspects of the present invention give municipalities and waste managers the ability not only to compare recycling rates and efficiencies with other municipalities and businesses, but also to establish superior datasets. This can provide a clear advantage when applying for grants from government and nonprofit agencies—high quality data can be used to clearly articulate where grant monies will be spent, and how the effects of those expenditures will be measured.

Various aspects of the present invention promote a system where the amount of a material (such as paper) that has been recycled can be analyzed in conjunction with existing data on a municipality's use of that material, thereby providing important accountings of energy use and economic activity, and information on the environmental effects of the municipality's use of the material.

The environmental benefits of recycling are that it saves energy, reduces greenhouse gas emissions, reduces air and water pollution, and conserves natural resources. To explain in more detail:

1. Recycling Saves Energy. The steps in supplying recycled materials to industry (including collection, processing and transportation) generally use less energy than the steps necessary to supply virgin materials to industry (including extraction, refinement, transportation and processing). In addition, energy savings associated with recycling may accrue in the manufacturing process itself, since recycled materials may require less additional processing.

2. Recycling Reduces Greenhouse Gas Emissions. Recycling reduces greenhouse gas emissions. Recycling reduces the need for industry to generate energy by burning fossil fuels. Recycling in lieu of landfill disposal also reduces emissions of greenhouse gases such as methane from landfills.

3. Recycling Reduces Air And Water Pollution. Recycling reduces a range of pollutants from entering the air and water. This benefit accrues, because of reduced fossil fuel use and the fact that recycled materials have already been processed once. The benefits also accrue because recycling keeps materials out of landfills, where they can introduce leachate into groundwater systems, and out of solid waste incinerators, which emit pollutants into the air and generate uncombusted ash residue.

4. Recycling Conserves Natural Resources. Recycling reduces the need for landfills and other disposal facilities, allowing land to be used in a more environmentally beneficial manner. Recycling also reduces the pressure to expand forestry and mining production by substituting recycled materials for the use of virgin materials.

An embodiment of the present invention provides a method and system for managing data relating to recycling by providing a database system comprising an input for receiving information from a recycling pickup vehicle, said information comprising sets of source identifications and associated recycled quantities. The database system can produce such information as:

i. a geographic analysis module for analyzing geographic recycling patterns of respective households;

ii. a historical analysis module for analyzing temporal trends of recycling for one or more respective households;

iii. a route analysis module for analyzing recycling statistics for a recycling pickup vehicle;

iv. a route optimization module for predicting an optimal recycling pickup vehicle route;

v. a compliance determination module for determining a statistical likelihood of a respective household compliance with recycling requirements; and vi. an incentive response module for determining a responsiveness of a respective household to recycling incentives.

BRIEF DESCRIPTION OF THE DRAWINGS

The invention will now be described by way of the drawings, in which.

DETAILED DESCRIPTION OF THE INVENTION

Figure 1:
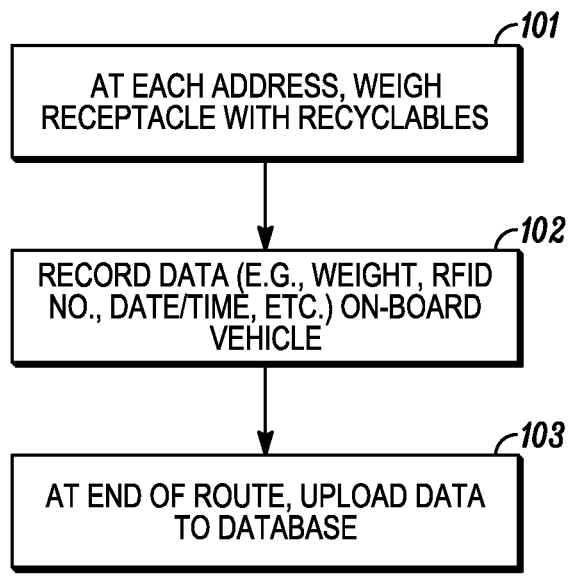
FIG. 1 shows elements of a recycling pickup vehicle experience (i.e., method)

An embodiment of the invention utilizes a unique rewards program that provides an economic incentive for households to increase their recycling rate. This aspect of the invention employs a method and system, that:

1. Matches a recycling container to a household address by providing an identifier such as a machine readable code (e.g., bar code and/or radio frequency identification [RFID] tag) on the container so as to associate the container with the household of origin;

2. Weighs the container at the time of pickup to determine the quantity of recyclable materials in the container during the normal pickup cycle;

3. Reads and/or analyzes data with an on-board computer aboard the recycling pickup vehicle;

4. Translates the record of recycling and the quantity of recyclable materials recycled into a credit amount (e.g., "RecycleBank Dollars"), and credits an account associated with the household;

5. Enables households to redeem the credit (e.g., "RecycleBank Dollars"), for example, at participating retailers for goods, services, coupons valued for goods or services, and/or other benefits or discounts; and 6. Enables the household to view their account and view information such as the dates of their recycling activity, the quantity recycled for a given period of time, how many credits (e.g., RecycleBank Dollars) they earned for recycling for certain recycling activity, the total amount of credits (e.g., RecycleBank Dollars) in their account, their shopping history with their credits (e.g., RecycleBank Dollars), and also enables the household to order RecycleBank Dollars to be used for purchases at participating retailers.

The benefits to households, governments and businesses is summarized in Table 1.

TABLE 1

| Benefits to Households | Benefits to Government | Benefits to Business |
| --- | --- | --- |
| Receive an economic incentive to recycle | Reduce taxes due to reduced costs of waste disposal | Build value from corporate citizenship |
| Reduce taxes due to reduced costs of waste disposal | Enhance collection routing efficiency | Access new marketing channel |
| Support responsible businesses | Enhance data collection and analysis | Measure return on investment |
| Preserves environment | Preserves environment | Preserves environment |

An embodiment of the invention provides a method and system for recycling comprising the provision to each household of an identified recycling container containing either a bar-code or an RFID tag. The container is automatically recognized or identified by a recycling pickup vehicle with an on-board weighing mechanism and a reader, and/or handheld reader/computer. The on-board weighing mechanism and/or handheld reader/computer records that the household has recycled and records the weight of the recyclables. A record is created that the household has recycled and the weight of the recyclables, and a value to the household account is assigned. Preferably, the household account can be viewed electronically via the Internet, although this functionality is not required (for example, monthly account statements can also be mailed to the household.)

Further, it is noted that the location of the recycling household can be performed manually, or via a global positioning system or other type navigation system.

An embodiment of the invention provides a system for carrying out the method set forth above. For example, the present invention specifically contemplates a recycling container labeled with a bar code and/or an RFID tag. Likewise, the present invention contemplates a bar code reader and/or an RFID tag reader associated with a recycling pickup vehicle, and a load cell system for determining the weight of the recycling container before and after emptying.

An embodiment of the invention utilizes a database and algorithms to assign a value to the household for recycling and for the amount recycled, which may be a financial (monetary or economic) value. The database and algorithms also enable the flexibility to apply different reward rates for recycling by household, street, township, city or state to ensure that households receive the optimum impact of the incentive. The household may, for example, view their recycling data on an Internet site which translates the amount of recycled material into a value and allows them to exchange the value for goods, services, coupons valued for goods or services, and/or other benefits or discounts.

An embodiment of the invention provides a method of presenting the data collected into a suite of reports that includes the ability to view data at a household, street, neighborhood, community, township, county, city or state level. The reports include the ability to view participation rates and averages, and recycling rates and averages. The data and reports are used to enhance collection routing and efficiency, and target community outreach. The data enables municipalities, private haulers, contractors, environmental consultants and governmental officials to understand when and where the recycling fleet should go, and to determine truck capacity for routes, and frequency of collection. The data enables municipalities, private haulers, environmental consultants, academics and government officials to perform targeted community outreach (as opposed to blanket advertising) and to measure the effectiveness of community outreach and recycling education efforts.

An embodiment of the invention provides a method for calculating the economic and environmental impact of the recycling efforts in participating communities.

An embodiment of the invention provides a method for building one or more marketing channels involving participating retailers, who benefit from an increase in brand value from their commitment to the environment and recycling, and to the local communities served by the recycling program.

An embodiment of the invention provides methods and systems for increasing recycling rates.

An embodiment of the invention provides methods and systems for decreasing the tax burden to government and businesses associated with waste disposal.

An embodiment of the system works in the following way:

Pickup (see FIG. 1):

1. At step 101, a recycling pickup vehicle with a recycle arm uses a scale to weigh recyclables for a given address. Each address/user in the database is provided a unique account number and that is associated with a unique machine readable code (e.g., an RFID tag) on a recycling container. At step 102, data collected on the route is initially stored on-board the recycling pickup vehicle.

2. Data collected by the on-board computer on the recycling pickup vehicle and/or handheld reader/computer is imported into the database.

3. When the data is imported, the event of the pick up and the weight of the pick up for each recycling container's machine readable code is associated with the address/user.

4. The event of the pick up and weight of the pick up are calculated to provide a value to the address/user for the recyclables. The value is determined by the system administrator and depends upon the availability of rewards and the current recycling rate for the population where the address/user is located.

Back End:

1. Participating retailers (and their related rewards) are recorded in the database.

2. A credit amount is associated with the rewards offered by the participating retailers.

The system preferably provides data from the recycling pickup vehicle as a text (.txt) file, although other data formats are suitable. This data file may have the following fields/columns:

(1) A customer ID, account ID, or container ID, which may include: an RFID tag number as the first 23 characters or digits; an 8-digit numeric fixed-length barcode or keyboard entry; another ID number; and a zero sequence code of the form "99999999999999999999999";

(2) Y2K—compliant transaction date, e.g., in format MM/DD/YYYY;

(3) Time, e.g., in 24-hour clock format HH:MM:00;

(4) Gross Weight, e.g., in 6 digits numeric format;

(5) Tare Weight, e.g., in 6 digits numeric format;

(6) Net Weight, e.g., in 6 digits numeric format;

(7) A Level Condition, e.g., a one-character or digit code meaning:

(7A) "L" indicates truck was level when transaction took place;

(7B) "E" indicates that the truck was out of level and that the weight not a legal weight; and (7C) "X" indicates zero sequence or weight error (Tare is larger than Gross);

(8) Truck ID, e.g., a two-digit numeric value that is configured during setup;

(9) A consecutive number, e.g., a six-digit number with automatic rollover; and

(10) A checksum, e.g., a three-digit numeric XOR of previous 76 characters.

At the end of the route, the data from the recycling pickup vehicle is downloaded into a data file. This data (.txt) file is then uploaded at step 103 via a web-form to the administrator toolset. The file upload itself is, for example, handled by a ColdFusion MX backend. Using Cold Fusion Markup Language (CFML), the system will read in the file. It then parses the file into a data structure. This data structure is then looped over such that each "pick-up" record is examined at one time.

The more a user recycles, the more credits the user earns. For each pound of recyclable goods, the user is given "X" account credits in the form of, for example, "RecycleBank Dollars." The number of credits that one residence can earn per month is, for example, $20. When the data file is submitted, the following fields/tables are updated for each user:

(1) Total weight that user has recycled to date: The weight of each "pick-up" is added to this accumulative weight and results in the total weight of all items recycled by the user since their account was opened.

(2) The uploaded data file may contain one or more "pick-up" records (for multiple containers at one residence). Each pick-up at a user's residence is stored individually in the database. Each record contains the fields (1-10) mentioned above (stored on the recycling pickup vehicle).

(3) Account Credit Amount: The weight of each "pick-up" at a residence (in the data file) is translated to account credits. This credit amount is then added to the existing account balance for the given user.

Each "pick-up" record is inserted into the Pickups data table. The data table is stored, for example, in a Microsoft SQL Server and is connected to through an ODBC connection. Upon insertion, each "pick-up" record is given a unique identifier by the database for later reference.

To help insure the data is not corrupted, the system attempts to ignore duplicate entries. Before inserting the new entry, a query for "pick-up" entries for the given user with the same date and time as the new "pick-up" data in question is executed. If the new "pick-up" data and the existing "pick-up" entry have the same date and time, it is assumed that this is a duplicate entry and it will therefore ignore it (not add it to the database).

For each "pick-up" record that gets inserted, the net weight of the recyclables is added to the user's total weight recycled to date.

For each "pick-up" record that gets inserted, the recycling event and the net weight of the recyclables is converted to an account credit equivalent, e.g., "RecycleBank Dollars." The User's table is then updated by adding this account credit value to the user's existing account credit balance.

At the end of this process, each new "pick-up" entry will have been entered into the database. The user's total recyclables and their account balance will have been updated.

Pseudo code for this process would look like this:

```
READ text file into data structure with individual records
FOR each record in text file
    Query for existing record with same data
    IF existing data
        Skip this record - it is duplicate
    ELSE
        Insert new data into database
        Update user information for:
            a.  Net weight recycled to date
            b.  Recycle Bank Dollar balance
    END IF
END FOR
```

Figure 2:
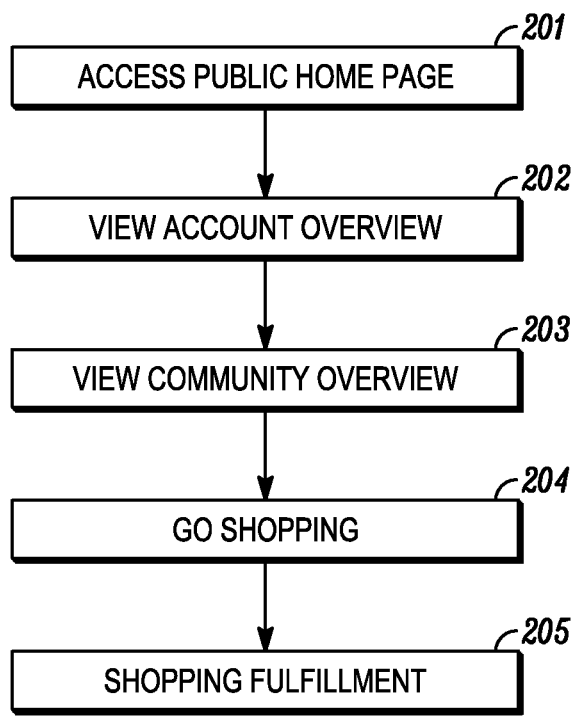
FIG. 2 shows elements of a user experience.

User Access (see FIG. 2). When the user enters the website at step 201, they login to the system using an account number and password. Since each user/residence has a unique account number, each user has only one login.

1. When the address/user logs in with their account, they can view their account overview at step 202, which may include: recycling activity and the amount of credits (e.g., "RecycleBank Dollars") that they have earned for recycling; net recyclables to date; amount recycled on a given week; amount/date of last pick up; and shopping history. The user may also be able to review account information and/or recycling information, use their account balance to shop, and at step 203 learn about community environmental initiatives.

2. The address/user is able to view participating retailers and rewards. To go shopping at step 204, a user must select the desired vendors. Then for each of the selected vendors, the user must designate the amount of account credits to spend. This value is then deducted from the user's account. For example, if a user chooses to spend $10 at three different vendors, then a total of $30 dollars is deducted from the user's account.

3. The address/user chooses rewards in exchange for the credits in their account. The value of the reward is deducted from their account. At step 205, once the user has designated the vendor and the dollar amount, a coupon or other item redeemable for goods may be shipped to the address associated with the user account. A user cannot spend more account credits than exists in their account, unless a mechanism for borrowing against future credits is defined, which may lead to a different psychological incentive to encourage recycling.

4. A report is generated that shows the date/time that addresses/users ordered rewards.

5. A reward and fulfillment process is initiated to deliver the reward to the user/address.

Figure 3:
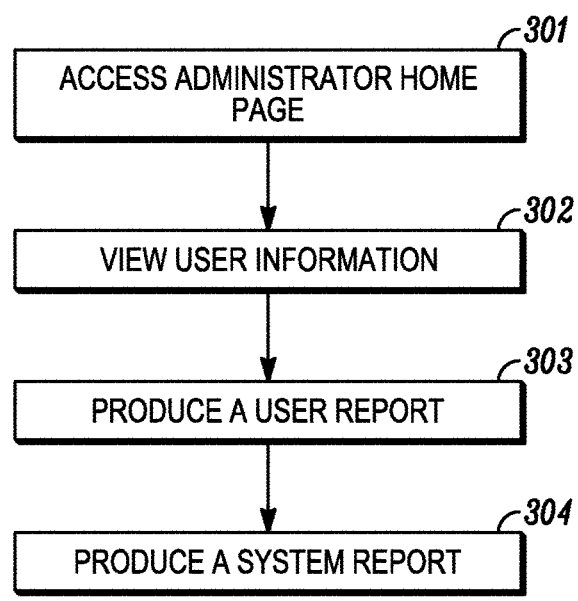
FIG. 3 shows elements of an administrator experience.

Data Analysis (see FIG. 3). FIG. 3 illustrates methods used by an Administrator in accordance with an embodiment of the invention. In the Administrator section, the Administrator must login at step 301 to the Admin Tool with a username and password. Regular users do not have access to the administration section.

The data collected is analyzed for recycling rates, participation rates, route efficiency, and performance analysis.

Address/user shopping information is recorded and analyzed to determine shopping patterns by neighborhood, region, and popularity.

Various reports may be generated based on the database, such as a Single User Report, a Full User Report, a Single Vendor Report, a Vendor Report, a Vendor Report (Graph), a Monthly Overview Report, a Monthly Route Overview Report, a Hauler Overview Report, an Analysis of Recycling and Participation Rates, a Daily Report of RecycleBank Rewards Ordered.

More specifically, Administrators can access a list of all residences entered into the system. For each user, administrators at step 302 can view the following information:

(1) The user's address and contact information (2) The total weight of recyclables for the user's residence (3) A complete list of "pick-ups" for a residence, including all form fields stored in the original Excel file submitted.

(4) A complete list of "purchases" made by the user using account credits, including amount, item, vendor, and date "purchased".

The Administrator at step 303 can export a user report of each user, which includes their recycling history, and their history of obtaining credits (e.g., "RecycleBank Dollars") and their use of credits at participating retailers. The Administrator at step 304 can also export a system report containing an overview of the system. The system report includes Individual Vendor Reports, Overview Reports, Hauler Reports and User Reports.

Reports can be run on the variety of data in the system. Reports can either be run globally or can be run within a single municipality, route, zip code, or street. Reports can be generated at any time or at regular time intervals such as weekly, monthly or yearly.

Single User Report:

The purpose of a single user report includes displaying the recycling history and earnings of an individual user, as well as the user's order activity.

Description: The Single User Report displays current as well as past recycling data for an individual user. Data includes: Current Balance, RecycleBank Dollars Earned This Month, Total Times Recycled, Average Weight Per Collection, Average Times Recycled Per Month, and Report Data Range. It includes the user's recycling history, with records of earnings on dates recycled. The report also includes a user's order history, with dates and contents of each order.

Full User Report:

The purpose of a full user report includes displaying the recycling history of a group of users.

Description: The Full User Report can be generated by Collection Route, Zip, Street, and Route. Data includes: Account Number, RFID#, User Address, Number of Times Recycled, Monthly Recycling Rate, Average Weight Per Collection, Weight of Most Recent Collection, and Current Balance.

Single Vendor Report:

The purpose of a single vendor report is to displays a list of users that have used their RecycleBank Dollars to shop at a particular vendor.

Description: The Single Vendor Report is generated for each individual vendor. The report displays the activity associated between individual Users and a selected Vendor. The data includes: User Address, City, State, Zip, Rewards Ordered (from selected Vendor), Date of First Order, Date of Last Order, and Percentage of RecycleBank Dollars Used at Vendor. The report can be generated by Collection Route, Zip, or by Street.

Vendor Report:

The purpose of a vendor report is to display how a collective group of homes have used their RecycleBank Dollars.

Description: The vendor report may be generated by collection route, zip code, or by street. The report displays the most popular vendors for a selected group of users. As a spreadsheet, data from the report includes: Coupon Percentage, Vendor Name, Coupon Count, and Total RecycleBank Dollars.

Vendor Report (Graph):

The purpose of a vendor report (Graph) is to display how a group of homes have used their RecycleBank Dollars.

Description: The vendor report (Graph) can be generated by collection route, zip, or by street for all vendors in the system. The report illustrates the most popular vendors for a selected group of Users or in the entire system. As a bar graph, the report displays vendors on the Y-axis and coupon percentage on the X-axis.

Monthly Overview Report:

The purpose of a monthly overview report is to display participation rates and of a group of users in a given time period.

Description: The monthly overview report can be generated by hauler, collection route, zip, or by street. Data is presented in the form of four series of bar graphs. The first series illustrates participation rates for the past 4 weeks. The second series illustrates weekly participation rates, displaying percentages of participating users for all weeks in the system. The third series illustrates a monthly overview, displaying participating users by average weight on a monthly basis. The fourth series illustrates weekly average and median weight recycled for users.

Monthly Route Overview Report

The purpose of the monthly route overview report is to display detailed information on the streets that comprise a particular collection route.

Description: The monthly route overview report can be generated by hauler or collection route. Data is presented in the form of four series of bar graphs. The first series illustrates monthly (4 week view) participation rates by street. The second series illustrates monthly (4 week view) household weights by street, showing the average amount recycled by each household (from that street) each month. The third series illustrates the weekly participation rate for each street. The fourth series illustrates the average weight recycled by each household, from that street, each week.

Hauler Overview Report:

The purpose of the hauler overview report is to display a monthly overview and weekly recycling report including weight recycled and participation rate.

Description: The hauler overview report can be generated from the list of haulers. Data is presented in the form of four series of bar graphs. The first series illustrates the participation rate for the past four weeks. The second series illustrates participation rates on a weekly basis. The third series illustrates a monthly overview, displaying weights by household. The fourth series illustrates weekly average of weight recycled, displaying the average weights recycled on a weekly basis.

Analysis of Recycling and Participation Rates:

The purpose of the analysis of recycling and participation rates report is to analyze the performance of recycling and participation rates by categorizing users as low, average, top, and strong recyclers.

Description: The analysis of recycling and participation rates report can be generated from the list of collection routes. Participation and recycling data is organized into quadrant tables for easier reference. Each quadrant (low, average, top, and strong) provides a clear segmentation of performance that enables outreach activities to be more direct and specific.

Daily Report of Recyclebank Rewards Ordered:

The purpose of the daily report of RecycleBank rewards ordered is to display the current list of RecycleBank Rewards ordered.

Description: The daily report of RecycleBank rewards ordered report displays the current list of RecycleBank rewards that have been ordered, but have yet to be shipped. This report is used on a daily basis to process the orders for shipment. As a spreadsheet, the report includes: order number, account number, address, coupon ordered, and date ordered.

Having thus described different embodiments of the invention, other variations and embodiments that do not depart from the spirit of the invention will become readily apparent to those skilled in the art. The scope of the present invention is thus not limited to any one particular embodiment, but is instead set forth in the appended claims and the legal equivalents thereof.

What is claimed is:

1. A method comprising:
   obtaining, at a computer database, at least one first record of a recycling event, wherein the at least one first record comprises:
   a first indication of the recycling event, wherein the first indication is indicative of a time of collection of recyclable materials; and
   an identifier indicative of a source of recyclable materials and a quantity of recyclable materials, wherein:
   the identifier is associated with a receptacle containing the recyclable materials and obtained at the time of collection of recyclable materials;
   the source of the recyclable materials is indicative of an entity associated with the receptacle; and
   the quantity of recyclable materials is determined from a first amount of the recyclable materials contained in the receptacle at the time of collection;
   obtaining, at the computer database, a second indication of the recycling event, wherein the second indication comprises a quantitative indication of a weight of the receptacle after collection, the weight determined by a weighing mechanism;
   adjusting the quantity of recyclable materials of the at least one first record as a function of the second indication;
   applying at least one reward rate, selected from a number of different reward rates, to at least a portion of the at least one first record to form credits of a single type for accrual to the source of the recyclable materials, the at least one reward rate being based on at least one demographic to which the entity is a member;
   storing, in at least one second record, the credits earned by the entity; and
   enabling the entity to select, from the computer database, at least a portion of the credits of a single type from a total of credits accrued of a single type, and to convert the at least a portion of the credits of a single type into rewards redeemable from any one or more of a plurality of third party providers, wherein the rewards comprise any one of a good, a service, coupon for a good, coupon for a service, and other economic benefit, from the one or more of a plurality of third party providers chosen by the entity, wherein the third party providers comprise different vendors, service providers and retailers, and wherein the rewards are generated at the computer database and are retrievable by the entity.

2. The method according to claim 1, wherein the identifier is obtainable from any of an optically readable bar code, radio frequency transponder, radio frequency identification tag and geographic identification code.

3. The method according to claim 1, wherein the quantity of the recyclable materials in the receptacle is determinable by weighing the receptacle prior to collecting the recyclable materials for recycling, and subtracting the weight of the receptacle after collection.

4. The method according to claim 1, wherein the quantity of the recyclable materials in the receptacle is determinable by measuring a volume of the recyclable materials of the receptacle.

5. The method according to claim 1, wherein the credits are dependent on the recycling event and on the quantity of recyclable materials in the receptacle.

6. The method according to claim 1, wherein the at least one first record is obtainable via a computational platform disposed aboard a vehicle adapted to collect the recyclable materials.

7. The method according to claim 1, wherein the at least one record is obtainable via a handheld device.

8. The method according to claim 1, wherein the at least one second record is stored in memory at the computer database, and accessible via a network, and wherein enabling the entity to convert the credits into rewards redeemable from third party providers comprises:
   receiving, from a computational platform associated with the entity via the network, a request to redeem the at least a portion of credits from the at least one second record;
   providing to the computational platform via the network, a response having an indication of the rewards available to the entity, wherein the rewards available to the entity are a function of a value associated with the credits.

9. The method according to claim 1, further comprising disseminating the rewards to the entity.

10. A system comprising a computing platform adapted to:
    obtain, and store in memory, at least one first record of a recycling event, wherein the at least one first record comprises:
    a first indication of the recycling event, wherein the first indication is indicative of a time of collection of recyclable materials; and
    an identifier indicative of a source of recyclable materials and a quantity of recyclable materials, wherein:
    the identifier is associated with a receptacle containing the recyclable materials and obtained at the time of collection of recyclable materials;

the source of the recyclable materials is indicative of an entity associated with the receptacle; and the quantity of recyclable materials is determined from a first amount of the recyclable materials contained in the receptacle at the time of collection;

obtain a second indication of the recycling event, wherein the second indication comprises a quantitative indication of a weight of the receptacle after collection, the weight determined by a weighing mechanism;

adjust the quantity of recyclable materials of the at least one first record as a function of the second indication;

applying at least one reward rate, selected from a number of different reward rates, to at least a portion of the at least one first record to form credits of a single type for accrual to the source of the recyclable materials, the at least one reward rate being based on at least one demographic to which the entity is a member;

store, in memory in at least one second record, the credits of a single type; and enabling the entity to select, from the memory, at least a portion of the credits of a single type from a total of credits accrued of a single type, and to convert the at least a portion of the credits of a single type into rewards redeemable from any one or more of a plurality of third party providers, wherein the rewards comprise any one of a good, a service, coupon for a good, coupon for a service, and other economic benefit, from the one or more of a plurality of third party providers chosen by the entity, wherein the third party providers comprise different vendors, service providers and retailers, and wherein the rewards are generated at the memory and are retrievable by the entity.

11. The system according to claim 10, wherein the computing platform comprises a portion, wherein the portion is adapted to:

receive the at least one first record via at least one communication link;

apply the reward rate to at least a portion of the at least one first record to form credits; and store, in memory in at least one second record, the credits.

12. The system according to claim 10, wherein the computing platform comprises first and second portions, wherein the first portion is adapted to:

communicate the at least one first record to the second portion via at least one communication link, and wherein the second portion is adapted to:

receive the at least one first record via the at least one communication link;

apply the reward rate to at least a portion of the at least one first record to form credits; and store, in memory in at least one second record, the credits.

13. The system according to claim 12, wherein the first portion is further adapted to communicate the at least one first record at a given time, wherein the given time comprises the time of collection or a time thereafter.

* * * * *